United States Patent
Hluchan et al.

(10) Patent No.: US 7,253,952 B2
(45) Date of Patent: Aug. 7, 2007

(54) HANDSFREE FIELDGLASSES HAVING FULL FIELD OF VIEW

(75) Inventors: Karen L. Hluchan, Woodbridge, CT (US); John B. Glaberson, Sandy Hook, CT (US)

(73) Assignee: Sparrow Woods Company, Woodbridge, CT (US)

( * ) Notice: Subject to any disclaimer, the term of this patent is extended or adjusted under 35 U.S.C. 154(b) by 78 days.

(21) Appl. No.: 11/228,795

(22) Filed: Sep. 16, 2005

(65) Prior Publication Data

US 2007/0064307 A1    Mar. 22, 2007

(51) Int. Cl.
*G02B 23/12* (2006.01)
(52) U.S. Cl. ........................ 359/407; 359/409
(58) Field of Classification Search ............... 359/407, 359/409
See application file for complete search history.

(56) References Cited

U.S. PATENT DOCUMENTS

| | | | |
|---|---|---|---|
| 558,889 | A | 4/1896 | Wittmann |
| 2,383,186 | A | 8/1945 | Glasser |
| 3,274,614 | A * | 9/1966 | Boyer ............... 2/427 |
| 5,923,396 | A | 7/1999 | Ulvio |
| 6,031,662 | A | 2/2000 | Miller et al. |
| 6,614,603 | B2 | 9/2003 | Himmele |
| 2002/0093622 | A1* | 7/2002 | Tostado ............... 351/57 |
| 2005/0008784 | A1* | 1/2005 | Martin et al. ........ 427/393.4 |
| 2006/0268220 | A1* | 11/2006 | Hogan ............... 351/47 |

OTHER PUBLICATIONS

"Heine HR Binocular Loupe Information," Miami Medical, http://www.miami-med.com/heine_hr_c-00.32.705.htm, 3 pages.
"Introducing our new XX Ultra-Light Loupes!" SheerVision, http://www.sheervision.com/index.htm, 1 page.
"BiOptic used for driving," BiOptic Driving Network, http://www.biopticdriving.org/, 3 pages.
"The VES-Mini Telescope," Ocutech, http://www.ocutech.com/vesmini.html 2 pages.
"2.8X Binocular Glasses," Magnifying America, http://www.wemagnify.com/Qstore/p000012.htm, 1 page.

* cited by examiner

*Primary Examiner*—Joshua L. Pritchett
(74) *Attorney, Agent, or Firm*—Beyer Weaver LLP (57) ABSTRACT

Handsfree fieldglasses providing increased clarity and magnification of a visual target in an outdoor application are disclosed. The handsfree fieldglasses can include eyeglasses, binoculars, and a customized connector coupling the eyeglasses and binoculars. The eyeglasses may include prescription lenses and/or polarized lenses. The lenses can have antireflective coatings, hydro-phobic coatings and/or a reduced or substantially flat base curve. The binoculars include adjustable separate lens arrangements having lengthy or infinite focal lengths to be placed against each eyeglass lens. The connector includes multiple fixed attachments and adjustable components such that the binoculars can be custom adjusted to rest against the eyeglasses and also to flip away from the eyeglasses while remaining coupled thereto. While resting against the eyeglasses, a user simultaneously perceives a full field of view having a magnified central portion and non-magnified outer portion. Perforated sideshields are used to reduce side glare while also permitting air passage.

20 Claims, 6 Drawing Sheets

HANDSFREE FIELDGLASSES HAVING FULL FIELD OF VIEW

TECHNICAL FIELD

The present invention relates generally to optical systems and devices, and more specifically to handsfree fieldglasses adapted for use in an outdoor environment.

BACKGROUND

Binoculars, fieldglasses, spotting scopes and other optical devices are generally well known and frequently used by many outdoor enthusiasts, such as hunters, fisherman, birdwatchers, and the like. For many, such optical devices aid in providing for increased enjoyment of various outdoor activities that might involve sighting or viewing details of a distant object. Of course, such devices are also known to have numerous other applications both indoors and outdoors, such as, for example, military activities, security and surveillance, neighborhood monitoring, and watching a concert, theater production or ballgame from the relatively cheaper seats, among others. Although binoculars, fieldglasses and other similar optical devices are generally available in a wide variety of types, shapes and sizes for a huge assortment of different applications and demands, it is generally true that most such devices need to be held or otherwise manipulated manually by a user during ordinary use.

Such a simple requirement can be very inconvenient in many instances, particularly where one or more target viewing objects are moving; where multiple target objects are to be viewed at once or in rapid succession; where the focus of the optical device needs to be adjusted during a viewing; or any combination of such factors. In addition, it may simply be tiring for a user to have to hold the optical device for extended periods of time during continuous activity. Various ways of overcoming the troubles associated with an optical device that typically needs to be held manually include stationary stands or holders, such as those used for telescopes.

Apparatuses and methods for coupling optical loupes to eyeglasses and other personal optical equipment are also well known, such as those items that are traditionally used by surgeons, dentists, jewelers and other professionals who often have a need to view close up items in particular detail. Particulars for other devices that can be used to couple optical loupes with eyeglass frames can also be found, for example, in U.S. Pat. Nos. 558,899; 5,923,396; and 6,614,603, each of which is incorporated herein by reference in its entirety and for all purposes. As generally used though, surgical and jeweler loupes tend to focus on a particular object that is located within a substantially short distance from the user. As such, the focal length of the added loupes tends to be quite short, such that visibility beyond a distance of about ten feet or so is typically not possible.

In addition, much of the various loupes and other prior art optical devices that are adapted to permit a user to wear the device in some manner typically result in a field of view through the device that is severely constrained or limited. Further, such a focused view through a set of loupes or other enhancing optical devices tends to be provided at the expense of any other possible viewing of any other object. In general, the human eyes and mind are typically not able to view and process images at different distances and focuses that are substantially different from each other. Thus, when one looks through a telescope to view an item, it is typically not possible for that person to focus on a distant object at, for example, a ten times magnification with one eye, while also focusing on and viewing that same object with zero magnification with the other naked eye. As such, the field of view that is seen by a typical person when looking through a telescope, binoculars, fieldglasses, spotting scopes, or other similar optical devices is usually limited to the field of view that is provided by the optical device that is being used. For some magnifying optical devices, the field of view provided is substantially limited, such that a user can experience some degree of tunnel vision while using the device.

Although the various devices and methods used for providing enhanced views through binoculars, fieldglasses, and other similar optical devices have been adequate in the past, improvements are generally encouraged. Based on the foregoing considerations, there thus exists a need for improved apparatuses and methods for allowing a user to view distant objects through a handsfree optical device having increased clarity and magnification, and for such a device to be able to provide a full field of view to the user while also providing such clarity and magnification.

SUMMARY

It is an advantage of the present invention to provide apparatuses and methods for viewing distant objects in a more convenient and comprehensive manner. According to one embodiment of the present invention, the provided apparatuses and methods involve the use of a handsfree optical device adapted to be worn on the head of a user, with such an optical device providing a full field of view with a least a portion thereof being subject to magnification. This is accomplished at least in part by providing eyeglasses or sunglasses, binoculars or other optical loupes, and a customized connector coupling the glasses and binoculars together as detailed below.

In some embodiments, a handsfree optical device or set of "fieldglasses" adapted to provide for increased clarity and magnification of a visual target in an outdoor application can include sunglasses adapted to be worn on the head of a user, binoculars adapted to be placed against the sunglasses, and a connector adapted to couple the binoculars to the sunglasses. The sunglass component can include two polarized lenses coupled to a lightweight frame having a frontal portion and two adjoining arms, which arms can be folding arms. The polarized lenses can each have a base curve that is substantially flat, as well as one or more coatings applied thereto, such as an antireflective coating and a hydro-phobic coating. The binoculars can generally include two separate optical arrangements coupled to a central shaft in a manner such that at least one of the separate optical arrangements can be rotated about the central shaft such that the angle separating the two optical arrangements is adjustable. Both of the optical arrangements preferably have infinite focal lengths.

The connector can be customized as desired, and may include one or more fixed attachments, such as to the sunglasses and also to the binoculars, as well as one or more adjustable components disposed therebetween. The adjustable component or components can work alone or together to permit a customized placement and adjustment of the binoculars against the sunglasses, and also to permit the binoculars to be readily flipped up and away from the sunglasses while still remaining coupled to the sunglasses via the connector. In addition, two perforated sideshields can be coupled to the lightweight frame and oriented along the adjoining arms, with such sideshields being arranged to reduce fogging and to reduce incoming glare from the sides of the sunglasses, while also permitting the passage of air therethrough.

In various embodiments, the sunglasses and binoculars are preferably adapted to operate in conjunction with each other to create a full field of view for a user, where such a full field of view has a central portion that is magnified and an outer portion that is not magnified, and where the user can observe both a visual target in the central portion and a separate object in the outer portion simultaneously and without detriment to each other. In some embodiments, this effect could involve viewing the same visual target or object in both the central portion and the outer portion simultaneously. To aid the user in being able to focus on one or more objects at different magnifications simultaneously, the level of magnification of the center portion with respect to the outer portion can be a four-times magnification, although other levels of magnification are also possible.

In various detailed embodiments of any of the foregoing or following general embodiments, at least a portion of said lightweight frame can be titanium, and one or more of the perforated sideshields can be metallic. In addition, the handsfree optical fieldglasses or device can be particularly adapted to be used to spot objects underwater at a distance of at least 40 feet from the user. Also, one or more of the fixed attachments can be removably connected to the lightweight frame, such that the overall connector and binoculars can be readily detached from the sunglasses. In still further detailed embodiments, at least one adjustable components of the connector includes a spring loaded mechanism that facilitates a manual adjustment of the component from one stable position to another without the need for any external tool.

In various alternative embodiments, the sunglasses may include prescription lenses customized for the user, and may even be replaced by regular eyeglasses. Instead of a substantially flat base curve, such a base curve may range from about zero to about six diopters or so. Further, instead of binoculars, some other form of optical loupes might also be used, with such optical loupes having focal lengths of greater than about ten feet. With respect to the sideshields, at least one can comprise a grid of perforations that extends to all edges of the perforated sideshield. With respect to the connector, ball and socket arrangements can be used for the adjustable components, as well as swivel pin arrangements.

In still further embodiments of the present invention, various methods of visually spotting objects underwater are provided. Such methods can include the steps of wearing by a user a handsfree optical device such as that described above, moving the head of the user such that the handsfree optical device is directed toward a region that is at least partially underwater, and observing at least one underwater object at the region through the handsfree optical device. In particular, observation can be made of one underwater object through a central portion of a full field of view of the handsfree optical device, and that underwater object or another object can be viewed through an outer portion of the full field of view simultaneously. One further method step can include manually adjusting the binoculars or other optical loupes from one stable "flipped away" position away from the eyeglasses or sunglasses to another stable position against the glasses while the handsfree optical device is still being worn by said user. In particular, such an adjusting step can occur between the moving and observing steps.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for methods of using the disclosed inventive handsfree fieldglasses. These drawings in no way limit any changes in form and detail that may be made to the invention by one skilled in the art without departing from the spirit and scope of the invention.

DETAILED DESCRIPTION

An example application of an apparatus and method according to the present invention is described in this section. This example is being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as limiting. In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

Advantages of the present invention include the provision of apparatuses and methods that improve the spotting and viewing of distant objects, such as in a sporting or outdoor setting. In particular, the ability to spot and view distant objects underwater while the user is above the water surface is greatly enhanced. Magnified visual effects with respect to target objects either above or below water are achieved for a user in a more convenient and comprehensive manner, particularly via the use of a handsfree optical device adapted to be worn on the head of a user. Increased clarity and magnification can be achieved without sacrificing much or anything in the way of a full field of view, which can allow users to continuously wear the inventive optical devices without needing to move or adjust the devices to be able to focus on other objects without magnification, such as to walk or otherwise conduct further activities that may require a full field of view and/or no magnification effects.

Figure 1:
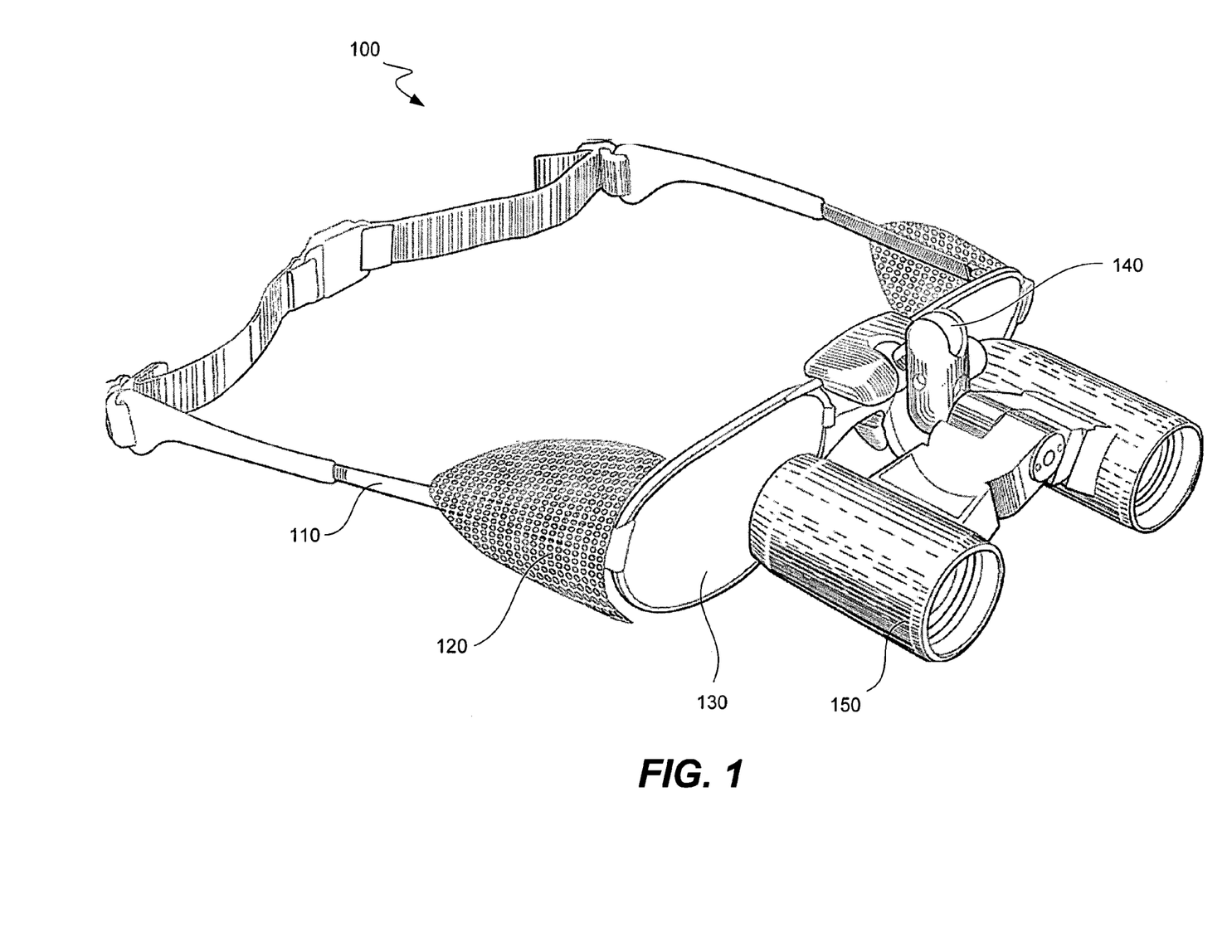
FIG. 1 illustrates in top perspective view an exemplary set of handsfree fieldglasses according to one embodiment of the present invention.

Turning first to FIG. 1, an exemplary set of handsfree fieldglasses according to one particular embodiment of the present invention is illustrated in top perspective view. It will be readily understood that these exemplary handsfree fieldglasses are merely one specific way of incorporating the various provisions of the present invention, and that there can be many other ways of doing so. As such, numerous alternative possibilities for constructing a handsfree optical device having similar properties may be undertaken, and it is specifically contemplated that any and all such alternative possibilities are included as part of the invention disclosed and claimed herein. With respect to the specific embodiment provided here, handsfree fieldglasses 100 include several major components, such as an eyeglass frame 110, a pair of sideshields 120, specialized lenses 130, a connector assembly 140, and a pair or set of binoculars or other optical loupes 150. Further considerations regarding each of these major components will be discussed in greater detail below.

In general, the various major components shown and listed here are adapted to work together to create a set of handsfree fieldglasses 100 that provide a user with increased clarity and magnification of a visual target in virtually any application. For outdoor applications in particular, a pair of polarized or sunglass lenses 130 can be used. The lenses 130 can have antireflective coatings to reduce glare, hydrophobic coatings for improved water resistance, or both. Preferably, each lens 130 is also created to have a reduced or substantially flat base curve, which brings the binoculars closer to the eyes of the user, thereby increasing the overall field of view. Adding to the convenience and overall quality of the handsfree fieldglasses 100 are a pair of perforated sideshields 120. Such sideshields can be attached to the arms of eyeglass frame 110, and are primarily used to reduce glare or other distracting imagery that might come through the sides of the fieldglasses while they are being worn. Sideshields 120 are also preferably perforated, thus permitting air passage therethrough and reducing the tendency of the fieldglasses to fog up on the inside during use, which can be a common problem depending upon the type of use.

The binoculars 150 or other optical loupes can be made from any of a wide variety of suitable commercially available housings and lens and prism arrangements. In general, such binoculars 150 or other optical loupes include two separate lens/prism arrangements that may be adjustable with respect to each other, such that customization for the particular eyesight and eye dimensions of a given user can be achieved. Such binoculars preferably have large or infinite focal lengths, such that distant objects can be seen clearly. The connector or connector assembly 140 includes fixed attachments and adjustable components such that the binoculars 150 can be custom adjusted to rest against the eyeglasses 110 and also to flip away from the eyeglasses while remaining coupled thereto at all times. In some embodiments, the connector 140 may be adapted to facilitate a readily removable coupling of binoculars 150 to glasses 110, such that the binoculars and some or all of the connector assembly can be completely removed for normal eyeglass use.

One important feature that results from an appropriate combination of the foregoing elements is that while binoculars 150 are resting against the eyeglasses 110, as shown in the handsfree fieldglasses 100 of FIG. 1, a user simultaneously perceives a full field of view having a magnified central portion and non-magnified outer portion. As noted, this can allow a user to enjoy the continuous benefits of having at least a portion of his or her field of view remain continuously magnified, while also allowing the user to view other objects or environments that are not magnified. Again, such a benefit is not trivial, as a user may be able to walk or otherwise move about freely without needing to remove or flip away the binoculars to do so.

Figure 2A:
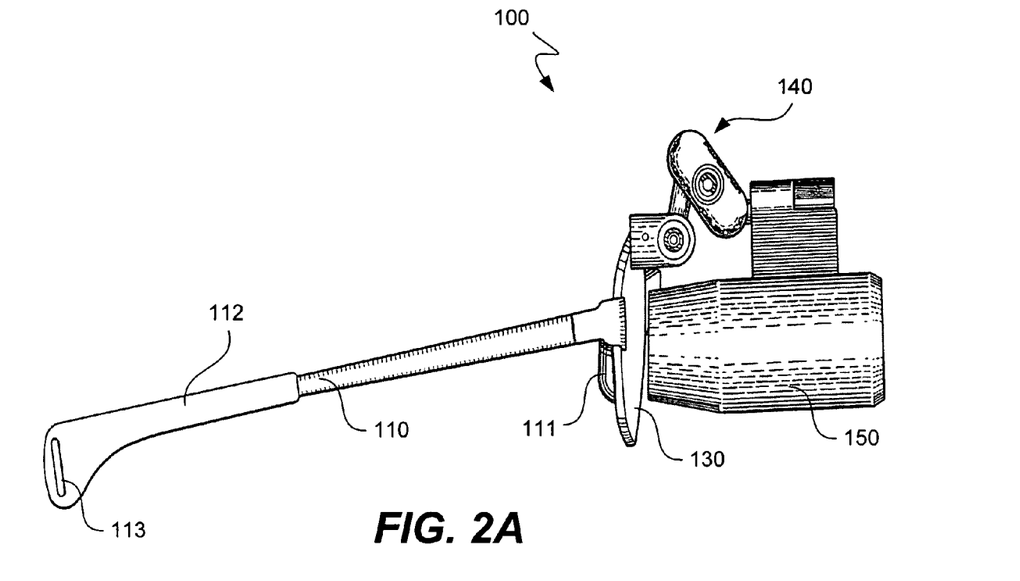
FIG. 2A illustrates in side elevation view the exemplary set of handsfree fieldglasses of FIG. 1 with the included binoculars in a down position according to one embodiment of the present invention.

Moving next to FIG. 2A, the exemplary set of handsfree fieldglasses of FIG. 1 are illustrated in side elevation view with the included binoculars in a down position according to one embodiment of the present invention. Eyeglass frame 110 includes a heavy duty nosepiece 111 on a front portion of the frame, adjoining arms along the sides of the front portion, each having an end earpiece 112, and strap holes 113 at the end of each earpiece for a connecting strap (not shown here). Although any suitable nosepiece can be used, a more sturdy type, such as heavy duty nosepiece 111 is preferable, due to the extra weight incurred by the addition of a connector assembly and set of binoculars. To that end, a thicker coating on each earpiece 112 may be desirable as well. As shown, connector assembly 140 is adjusted such that the binoculars 150 are placed in a lowered or flipped down position up against the lenses 130. As will be readily appreciated, this lowered or flipped down position shown in FIG. 2A is the position at which a field of view having a magnified portion (by the binoculars) is made available to the user.

Unlike typical eyeglass or sunglass lenses, which tend to have a significant amount of curvature at the front surface, lenses 130 preferably have a substantially flat, flattened or "zero" base curve. Such a feature enhances the use of handsfree fieldglasses 100 by permitting the binoculars 150 to be placed substantially close to the eyes of the user. The specific advantage gained from such an arrangement is that the overall field of view can then be maximized. In general, every binocular has an "exit pupil" position, which is the distance from the eyepiece where the bundle of rays is smallest or has a "waist." Such a position can be the best place to put the eye of the user, such that the eye pupil does not block any of the rays and thus overall field of view. Although a longer exit pupil is desirable, this is usually accomplished by enlarging certain optical elements, which is undesirable with respect to the streamlined roof prism style binoculars of the present invention. As will be appreciated then, the further that binoculars 150 are spaced apart from the eyes of the user, the less effective that the use of this optical device will become. To this end, added reductions in the distance between the eyes of a user and the binoculars can also be achieved through adjusting various dimensions in one or more of the frame and eyeglass components, such as the nosepiece 111, the front portion of the frame 110, and the thickness of the lenses 130. Thus, it is preferable that the nosepiece 111 not be unduly large or protrude far behind the front portion of the frame 110, and it is also preferable that lenses 130 be reasonably thin.

With respect to the actual base curve, it is generally well known in the art that the base curve, or curvature of the front portion of the eyeglass lens, is about six diopters for most types of eyeglasses or sunglasses. Thus, the industry standard for most glasses is to produce lenses having front surfaces with curvatures equivalent to a circle having a radius of about ⅙ of a meter. The effective result of such a curved front surface is that binoculars or other optical loupes or equipment that are placed against the front surface of such lenses are spaced a significant distance away from the eyes of the user. Such a distance is reduced significantly by using lenses that have a reduced base curve, such as one lower than about six diopters. Of course, while substantially flat or zero base curve lenses may be preferred, use of lenses with a base curve between zero and six diopters will still result in some improvement over lenses that are made to common industry standards, as will be readily appreciated.

Figure 2B:
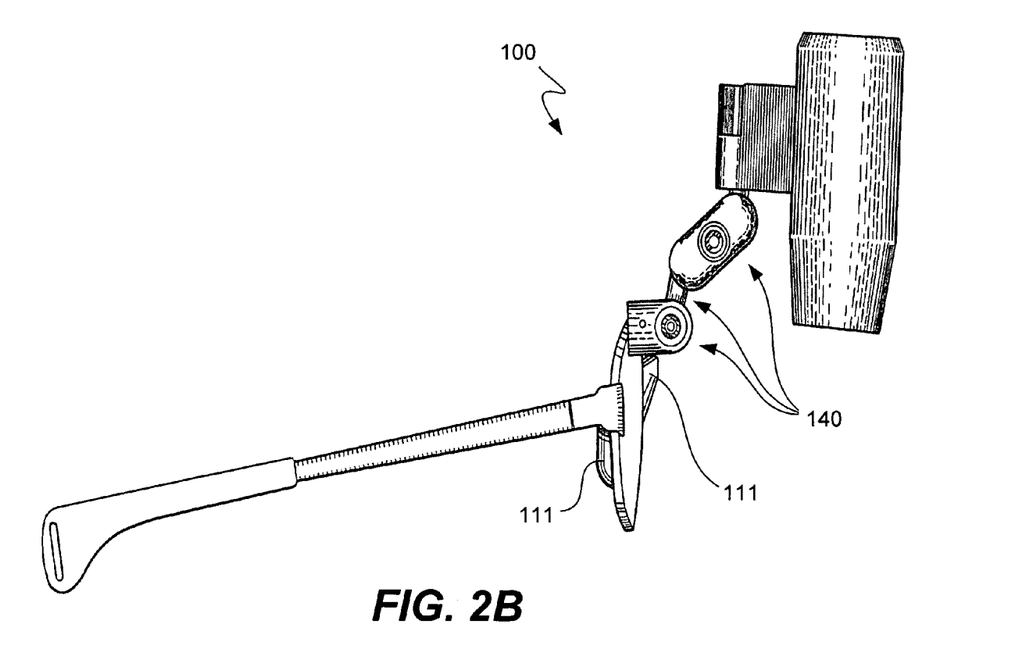
FIG. 2B illustrates in side elevation view the exemplary set of handsfree fieldglasses of FIG. 1 with the included binoculars in an up position according to one embodiment of the present invention.

Continuing on to FIG. 2B, the exemplary set of handsfree fieldglasses of FIG. 1 are illustrated in side elevation view with the included binoculars in an up position according to one embodiment of the present invention. As can be seen from the figure, the connector assembly 140 of handsfree fieldglasses 100 has had several adjustments such that the binoculars are "flipped up," or positioned up and away from the eyeglass lenses. In the particular embodiment shown, there are three separate joints as part of connector assembly 140 that permit such movement and adjustment of the binoculars with respect to the glasses, further details of which are provided below. As can also be seen, the overall design preferably results in a significant portion of nosepiece 111 protruding past the front portion of the eyeglass frame, such that the frame will be positioned even closer to the eyes of a user wearing the handsfree fieldglasses 100. Again, this is preferable in order to create an overall full field of view having a magnified portion (via the binoculars) and a non-magnified portion that a user can perceive simultaneously.

Figure 3:
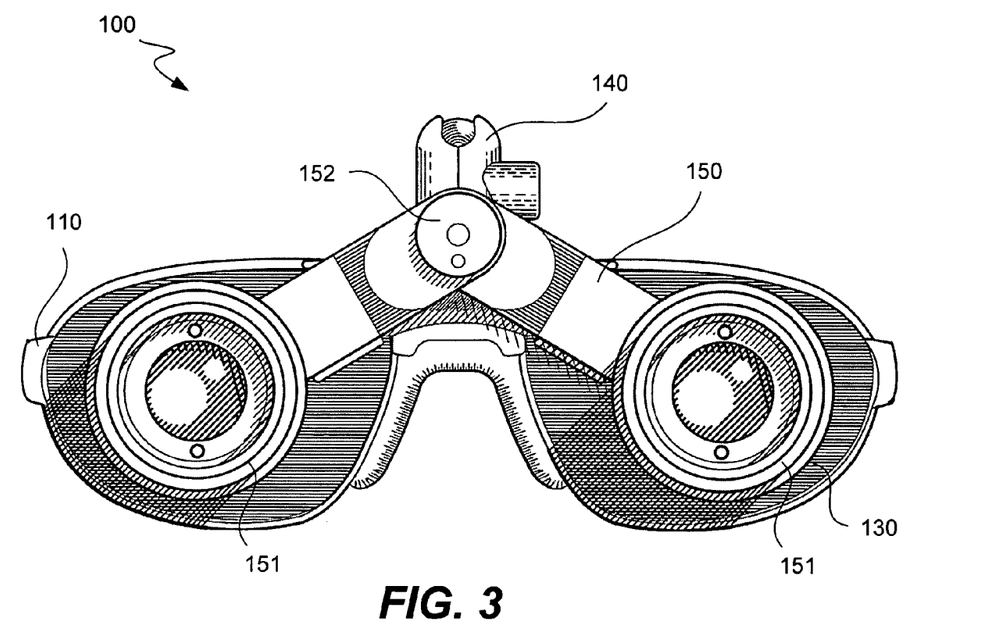
FIG. 3 illustrates in front elevation view the exemplary set of handsfree fieldglasses of FIG. 1 with the included binoculars in a down position according to one embodiment of the present invention.

With respect to FIG. 3, the exemplary handsfree fieldglasses of FIG. 1 are illustrated in front elevation view with the included binoculars in a down position. The handsfree fieldglasses 100 of this figure are positioned in essentially the same way as those of FIG. 2B. Although eyeglass frames 110, lenses 130, connector assembly 140 and binoculars 150 are clearly visible from this alternative perspective, the relatively thin sideshields may not be readily apparent. With respect to the binoculars 150 in particular, it is contemplated that a variety of commercially available and/or customized binoculars or optical loupes can be used. Given the nature and desired properties of the handsfree fieldglasses, streamlined binoculars such as roof prism type binoculars are preferred. Of course, other designs and types may also be possible for use with the present invention, although it is preferable for any design that the amount of binocular casing be minimal so as not to unduly block or interfere with the overall field of view, as discussed in greater detail below. In fact, other forms of optical loupes may also be possible, so long as the overall design permits for the magnified viewing of remote objects while also allowing for a field of view region that is not magnified and not otherwise blocked by the loupes.

Whatever type of binoculars or other possible set of optical loupes or devices are used, it is preferable that such an optical device include two separate optical arrangements 151 coupled to a central shaft 152, such as that which is shown in the roof prism style binoculars 150 of FIG. 3. In some embodiments, at least one of the two separate optical arrangements 151 can be adapted to be rotated about the central shaft 152, such that the angle defined by separate optical arrangements 151 and central shaft 152 is adjustable. Thus, the binoculars 150 can be adjusted by using such a feature so that the distance between the centers of the optical arrangements matches the distance between the eyes of the user. As will be readily appreciated, this distance will vary from user to user, such that the binoculars 150 can be adjusted to match the physical characteristics or preferences of each user as desired. Of course, other suitable mechanisms may also be used to adjust the interocular distance to suit a given user, and it is specifically contemplated that any such suitable mechanism may be used with the binoculars of the present invention.

It is also preferable that each of the lens and prism arrangements within each optical arrangement 151 be configured such that the focal length of each optical arrangement is significantly long. For example, a minimum of ten feet is thought to be appropriate, with forty feet or longer being preferable. In some embodiments, an infinity focus for each optical arrangement may be incorporated. Where such binoculars having infinity focus or infinite focal lengths are used, it becomes possible for the user to be able to spot, focus on and observe target objects at significant distances. Such distances may be at least about ten feet away, more preferably about forty feet away or further, and may also be hundreds of feet away in some instances. Although binoculars having an infinity focus may not be universally available, such optical devices can be readily created by those skilled in the art through the use of properly shaped lenses and prisms. For example, one or more meniscus type lenses may be used in the formation of an optical arrangement having an infinity focus.

In addition, it is also contemplated that the overall magnification of the binoculars 150 or other suitable optical loupes be set at a significant yet not too powerful level. For example, a magnification power of two to ten times might be used, with a more appropriate range being from three to six times, while a four-times magnification power is thought to be particularly appropriate for the current application. Such a magnification power allows for a significant increase in image size and clarity without unduly hindering the ability of the user to perceive simultaneously other items within the field of view that are not so magnified. Again, such an overall field of view effect is set forth in greater detail below. Although the particular binoculars or optical loupes as specified herein might possibly be commercially available, it is known that a wide variety of vendors would be readily able to construct a compact set of roof prism binoculars having infinite focal lengths for use with the present invention. Such a vendor could be, for example, Carl Zeiss A. G. of Oberkochen, Germany, among others.

Figure 4:
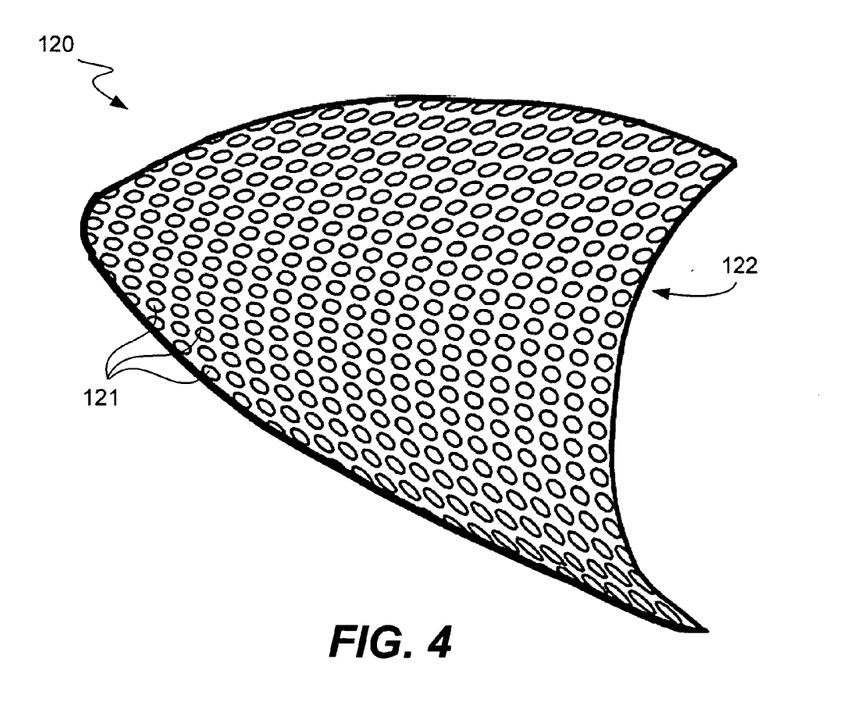
FIG. 4 illustrates in side elevation view an exemplary sideshield adapted for use with the set of handsfree fieldglasses of FIG. 1 according to one embodiment of the present invention.

FIG. 4 illustrates in side elevation view an exemplary sideshield adapted for use with the set of handsfree fieldglasses of FIG. 1 according to one embodiment of the present invention. As seen, sideshield 120 includes a plurality of perforations 121, which permit the passage of air therethrough for better circulation within and about the region between the fieldglasses and the eyes of the user. Such perforations can be roughly the size of a pinhead, although other sizes may also be suitable to achieve the intended purpose. Because of perforations 121 within sideshields 120, the inner portion of the lenses 130 are much less likely to become fogged during use. Although the perforations do permit air and light to pass therethrough, these "holes" are small enough and arranged in such a manner so that glare from a side angle does not ordinarily become a factor. Further, a user cannot ordinarily see or perceive any activity through the sideshields, due their limited size.

As shown, the perforations 121 can be arranged in a pattern, such as a grid-like pattern, which can extend to all edges of the sideshield. Of course, other patterns and arrangements of perforations may also be similarly suitable. In some embodiments, each side shield can be attached to an arm of the eyeglass frame 110, with front curved edge 122 either abutting or closely approaching the outside perimeter of the associated lens 130. Where the adjoining arms on the eyeglass frame are adapted to be folded, each sideshield would then fold with its respective arm, as will be readily understood. In some embodiments, sideshields 120 can be constructed of one or more sturdy materials, such as a metal. Alternatively, a cloth or other similar material may also suffice. Each sideshield 120 can be relatively thin, so as not to unduly interfere with folding the arms of the glasses to compact the overall device 100. Further, each sideshield 120 can be tapered toward the back end, as shown, such that an effective blockage of glare from peripheral or side angles can be accomplished with a minimal amount of materials.

Figure 5:
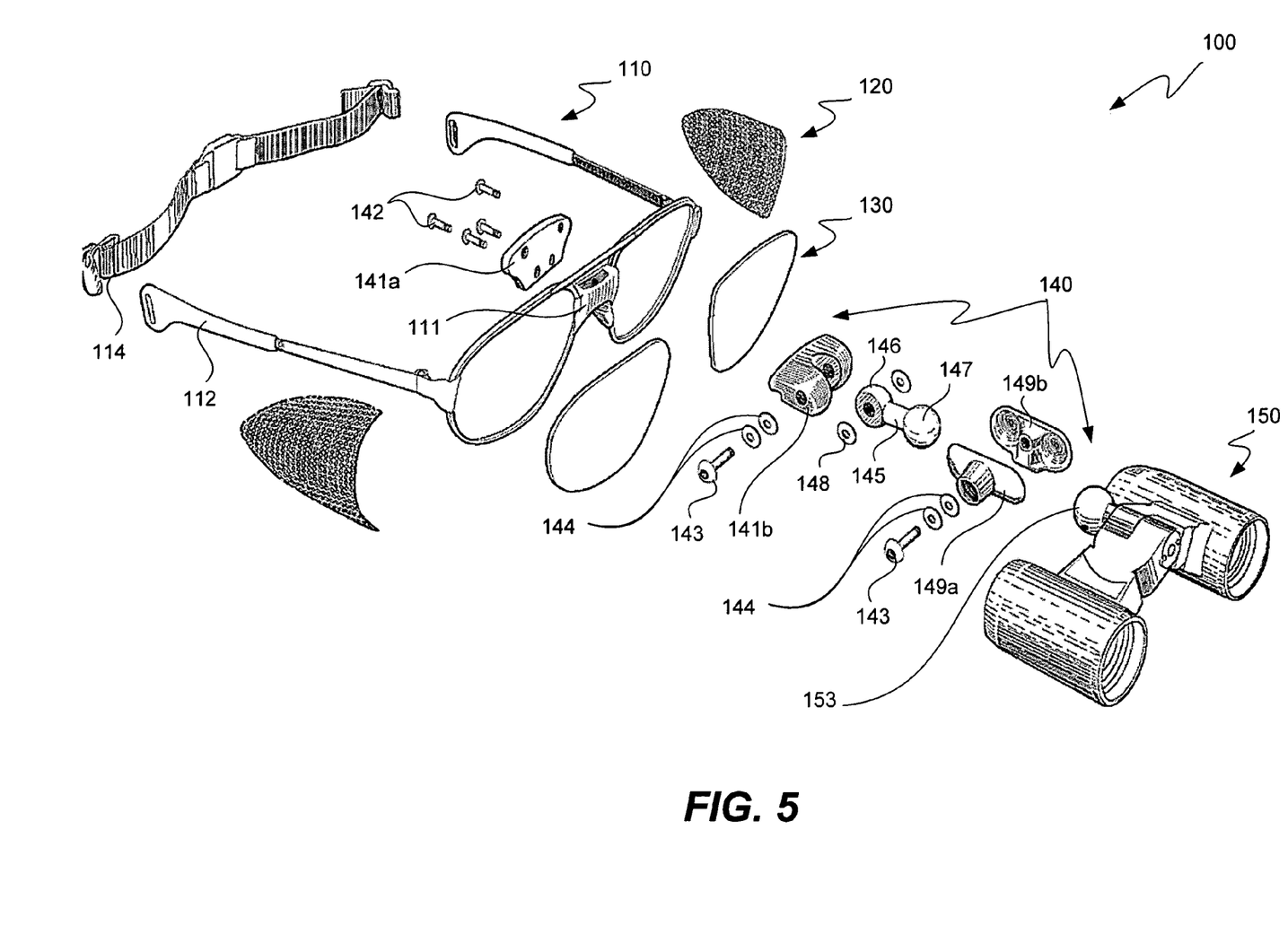
FIG. 5 illustrates in exploded perspective view the exemplary set of handsfree fieldglasses of FIG. 1 according to one embodiment of the present invention.

Turning next to FIG. 5 the exemplary handsfree fieldglasses of FIG. 1 are illustrated in exploded perspective view according to one embodiment of the present invention. As noted previously, handsfree fieldglasses 100 include a number of major components, such as one eyeglass frame 110, two attached sideshields 120, two incorporated eyeglass or sunglass lenses 130, a connector assembly 140 and a set of binoculars 150 or other optical loupes. Frame 110 includes a rugged nosepiece 111, two adjoining arms having earpieces 112 and a strap 114 that can be placed across the back of the head of a user. The adjoining arms may be folding arms, as are commonly known in the eyeglass frame arts, and use of the strap 114 is preferable in order to keep the handsfree fieldglasses 100 on the head of user, particularly during periods of physical activity. Details of the sideshields 120, lenses 130 and binoculars 150 are provided above, such that the focus now shifts to the connector assembly 140.

Connector assembly 140 includes a number of fixed and adjustable components, which all work in conjunction to couple the binoculars 150 to the glasses frame 110, while also permitting for various adjustments of the two with respect to each other. Fixed attachment halves 141a and 141b are put together by screws 142 to fasten and clamp across the nosebridge or other upper part of the front portion of glasses frame 110. Although screws are used in the present example, it will be readily appreciated that a wide variety of other fastening devices or means may also be used, such as, for example, bolts, nails, rivets, staples, glue, clamps, Velcro®, or press-fit items, among others. Mating with fixed attachment 141a, 141b is a first adjustable link 145, which has a backside pin accepting swivel type end 146 and a frontside ball 147 for a ball and socket joint.

When assembled, backside pin accepting swivel type end 146 operates in conjunction with fixed attachment half 141b and assembly bolt 143 to create a swivel joint. As can be seen, end 146 is inserted, along with two washers 148 on either side, into fixed attachment half 141b, after which assembly bolt 143 is inserted through both and threaded at its tip into an accepting thread (not shown) within the far side of fixed attachment half 141b. Such an accepting thread may be integrated into the fixed attachment half 141b, or may alternatively be embedded as part of a thread sleeve that can be press fit into the fixed attachment half 141b. Two belleville springs 144 are preferably installed along with assembly bolt 143 as shown, such that a certain tension level can be achieved in the swivel joint created by the bolt 143, the fixed attachment 141a, 141b and the first adjustable link 145. By using such springs, the positioning of first adjustable link 145 from one set position to another can be made manually without the need for an allen wrench or other similar tool. With assembly bolt 143 tightened to just the proper level, such a manual adjustment can then result in a repositioning that is sufficiently stable, such that the swivel joint will not shift or reposition itself on its own, as will be readily appreciated.

The ball end 147 of the first adjustable link 147 is set within a backside ball socket formed by combining the separate halves 149a, 149b of a second adjustable link. Second adjustable link 149a, 149b can also be formed through the use of another threaded assembly bolt 143, as well as one or more additional belleville springs 144. As in the foregoing examples, a receiving thread can be integrated into second adjustable link half 149b, and the bolt 143, springs 144 and second adjustable link 149a, 149b can all be assembled and tightened to a suitable tension, such that the two ball and socket joints created thereby are strong enough to support a given set position at each joint, but loosely enough so that a user can manually adjust each joint as desired without needing to resort to the use of external tools, such as a screwdriver, wrench or the like.

As shown in FIG. 5, the ball used for the second ball and socket joint formed by second adjustable link 149a, 149b is also the second fixed attachment 153, in that this ball/fixed attachment is firmly affixed to the binoculars 150. Also, although not shown, one or more of the fixed attachments 153 and 141a/141b may be adapted so that removal from the eyeglass frame 110 can be readily accomplished. Such an adaptation can be had by way of a clamp, screw attachment, set of bolts and wing nuts, or any other suitable way of creating a readily detachable connection. As noted above, such an arrangement can facilitate the ready adaptation of the eyeglasses or sunglasses to be worn as ordinary eyewear, as may be desired by a given user in a particular application. In any event, connector assembly 140 includes two fixed attachments and two adjustable components, with the coupling of each in series resulting in three adjustable joints, one swivel joint and two ball and socket joints.

Figure 6A:
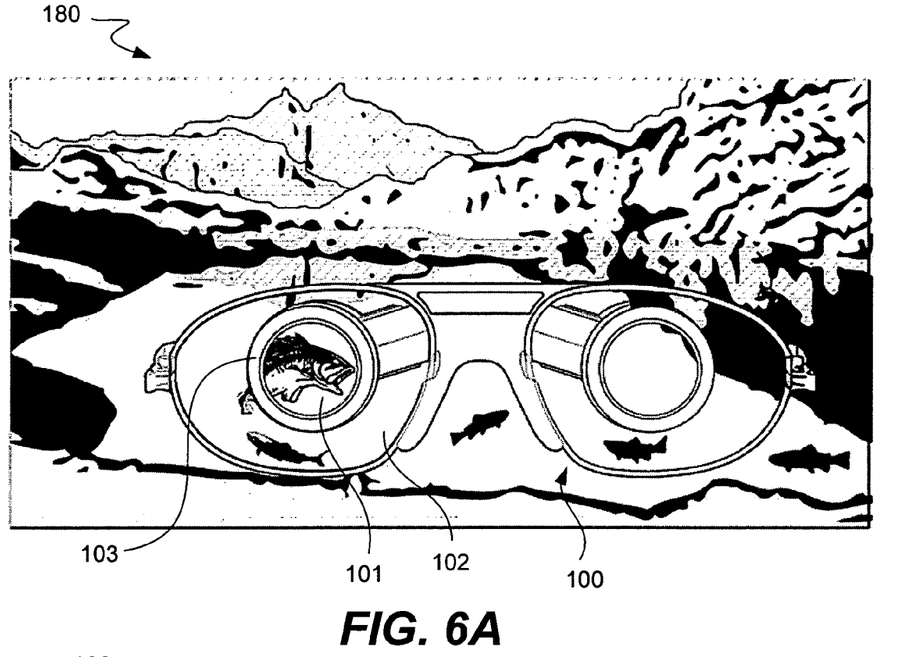
FIG. 6A illustrates an exemplary environment and a full field of view within the environment as seen from the set of handsfree fieldglasses of FIG. 1 according to one embodiment of the present invention.
Figure 6B:
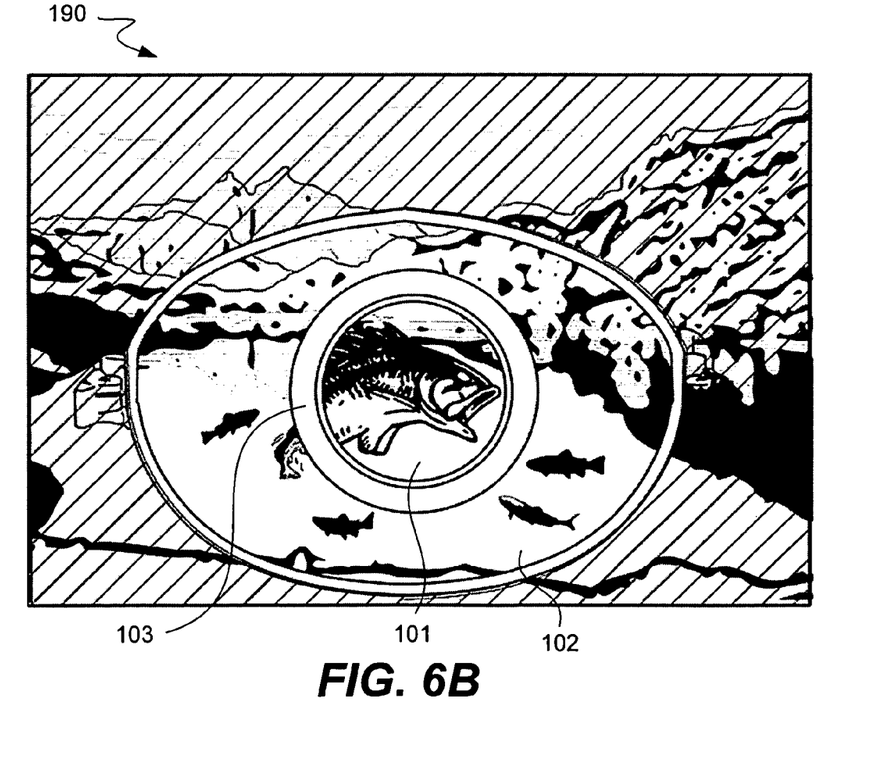
FIG. 6B illustrates a close-up of the exemplary environment of FIG. 6A, and a full field of view within the environment as seen from the left lens of the set of handsfree fieldglasses of FIG. 1 according to one embodiment of the present invention.

Moving next to FIGS. 6A and 6B views of exemplary environments and full fields of view within the exemplary environments as seen from the set of handsfree fieldglasses of FIG. 1 are shown. Starting first with FIG. 6A, outdoor environment 180 depicts a mountain lake having various fish therein. Handsfree fieldglasses 100 are being worn by a user, with the full field of view being that which can be seen by the user through the eyeglass lenses. As shown with respect to the left eyeglass lens, the full field of view for the left side comprises a magnified region 101, a non-magnified region 102, and some amount of blocked or non-visible space 103. As will be readily appreciated, such blocked space 103 results from that portion of the full field of view that is slightly blocked by the binocular casing, as well as some portion of view that is lost in the transition from non-magnified view 102 to magnified view 101. In particular, a fish can be the target object that is visible or at least partially visible within magnified region 101. While the target fish is certainly one object that is visible within the magnified region, it should be appreciated that other objects may also be clearly viewed at the same time within the magnified region, such as the background lake and/or mountains. This is particularly true where the binoculars have an infinity focus, as noted above.

Continuing on to FIG. 6B, this concept is discussed in a bit more detail with respect to sub-environment 190. The view depicted here is again with respect to that which is seen through the left eyeglass lens by the user. As such, the cross-hatched region outside the eyeglass lens profile is typically not seen by the user, while all that falls within the eyeglass lens profile is seen by the user. Of course, a user may be able to see around the edges of the eyeglass frame into some of the cross-hatched area if desired, but focus generally will tend to be on that which is visible through the lenses. Again, this results in a full field of view that includes a magnified region 101 at the center, a non-magnified region 102 surrounding the center region, and a relatively small blocked region 103 between the two. For purposes of the present illustration, it can be assumed that the target object fish being viewed is about 10 to 15 feet away from the user, as shown. In fact, various other distances can be also used for spotting and viewing target objects with the provided handsfree fieldglasses, such as, for example, 40 feet, 100 feet, and 200 feet or more, among others, such that it will be appreciated that the illustrations of FIGS. 6A and 6B merely show one of the relatively shorter possible viewing distances that can be had by using the present invention. As can be seen from FIG. 6B, the target object fish is partially within the magnified region 101 while simultaneously also being partially within the non-magnified region 102. Where the magnification level is not overly powerful, such as, for example, only four-times magnification, a user looking through the sunglasses and binoculars is able to focus on and see objects in both regions simultaneously and without detriment to each other, as is shown.

Although it is possible to see the same fish within both regions at the distance given, it may be entirely possible for the same size fish or object to fall entirely within the blocked region 103 at greater distances. This is due to the fact that there will always be some loss of what can be seen in the transition from a non-magnified region to a magnified region within the same field of view, as will be readily appreciated. Overall, however, the effect of a user being able to perceive simultaneously objects that are magnified as well as others that are not can be quite powerful. For example, a user may be able to focus on and watch the same fish or the same bird within the magnified region 101, while also paying attention to and getting cues from various objects in the non-magnified region 102, since both regions are simultaneously within a robust full field of view of the user. This can permit a user to walk or otherwise move about without losing primary focus on the target object or objects within the magnified region.

In addition to fish, birds and other game, another particularly useful application for the present invention can be to spot underwater mines or other such hazards. In particular, use of the present invention has been noted to be particularly helpful with respect to spotting and observing underwater objects. Such use can be particularly enhanced through the incorporation of polarized lenses, such as through the use of polarized sunglasses with the overall handsfree fieldglasses. It has been noted that use of such polarized lenses tends to cut the glare reflected from the water surface so as to facilitate viewing underwater objects to depths of several feet or more. Of course, such use can be particularly advantageous for fisherman then, particularly where spotting fish at a reasonable depth and at some distance from the user is desirable. Although such applications can be particularly useful, it is also contemplated that the present invention can be used in a wide variety of other settings, including those that are both outdoor and indoor settings.

Figure 7:
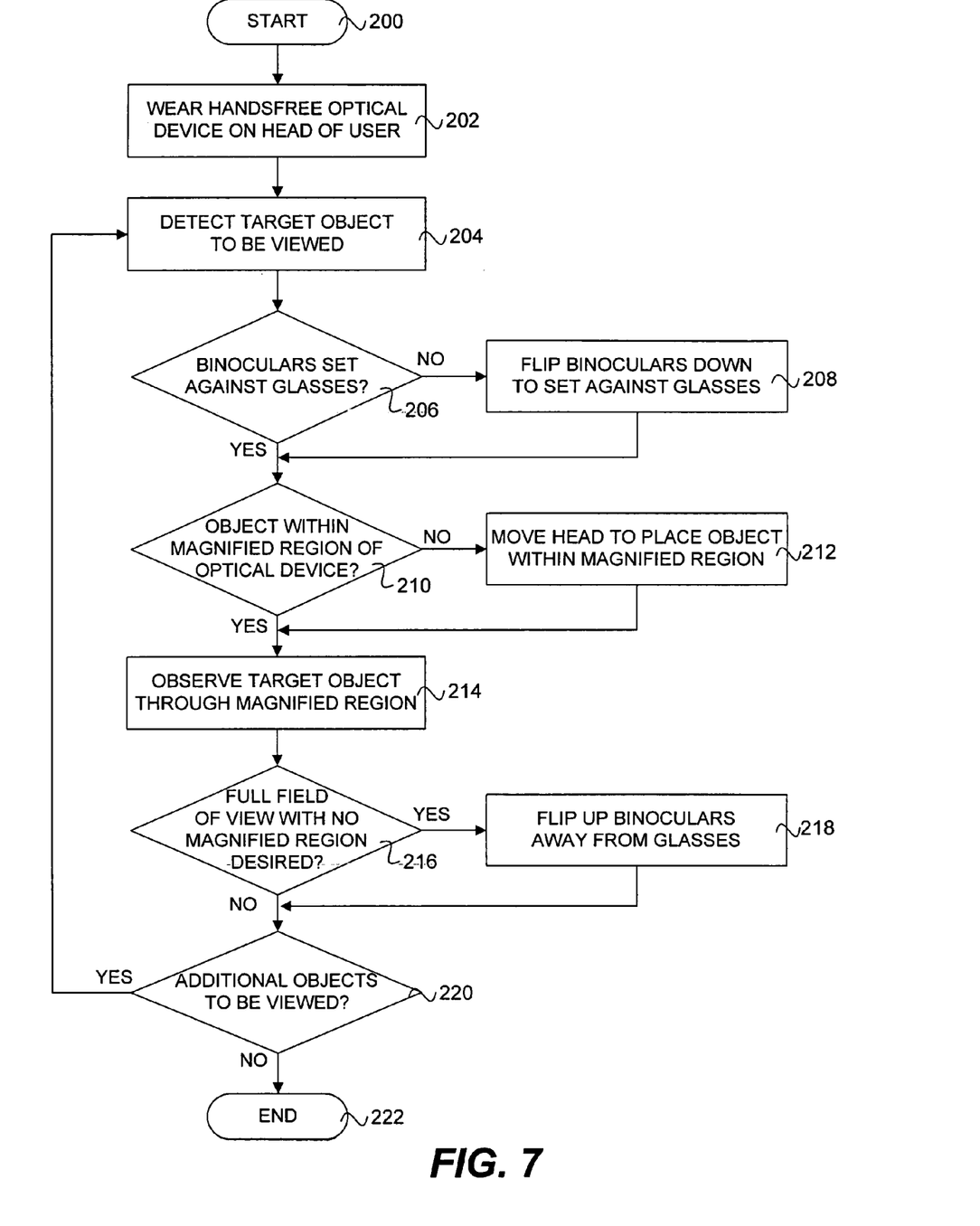
FIG. 7 illustrates a flowchart of one exemplary method of spotting objects underwater using the exemplary set of handsfree fieldglasses of FIG. 1 according to one embodiment of the present invention.

Turning lastly to FIG. 7, a flowchart of one exemplary method of viewing or spotting objects underwater using the exemplary set of handsfree fieldglasses of FIG. 1 according to one embodiment of the present invention is illustrated. While the provided flowchart may be comprehensive in some respects, it will be readily understood that not every step provided is necessary, that other steps can be included, and that the order of steps might be rearranged as desired by a given user. After start step 200, a user wears a handsfree optical device on or about his or her head at process step 202. Such a handsfree optical device can be any of the various specific embodiments detailed above, such as a set of handsfree fieldglasses, as well as any other similarly suitable optical device adapted to be worn on the head of a user.

At subsequent process step 204, a target object to be viewed is detected. Again, such a step may not be necessary, as some users may utilize a method whereby the target object is simply viewed immediately, such that a detection step may not be necessary. At a following decision step 206, an inquiry is made as to whether the binoculars are actually set against the glasses. If not, then the method moves to process step 208, where the binoculars can be flipped down into such a position for a proper viewing. At subsequent decision step 210, an inquiry is made as to whether the target object to be viewed is actually within the magnified region of the optical device (i.e., handsfree fieldglasses). If not, then the method moves to process step 212, where the head of the user is rotated or otherwise moved such that the target object is placed within the magnified region of the full field of view offered by the optical device.

The method then continues to process step 214, where the target object is observed by the user through the magnified region. At the following decision step 216, an inquiry is made as to whether a full field of view having no magnification might be desired. If so, then the user can flip the binoculars up and away from the glasses at process step 218. At subsequent decision step 220, it is questioned whether additional objects are to be viewed using the handsfree fieldglasses. If so, then the method reverts to process step 204, where process steps 204 through 220 are then repeated. If not, however, then the method ends at end step 222. Again, various details and additional steps may similarly be included, and it is specifically contemplated that many different arrangements of steps and variations of this exemplary method may also be practiced.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A handsfree optical device adapted to provide for increased clarity and magnification of a visual target in an outdoor application, comprising:

sunglasses adapted to be worn on the head of a user, said sunglasses including two polarized lenses coupled to a lightweight frame having a frontal portion and two adjoining arms, said polarized lenses each having a base curve that is less than about six diopters and antireflective and hydro-phobic coatings applied thereto;

at least two perforated sideshields coupled to said lightweight frame and oriented along said adjoining arms, said perforated sideshields being arranged to reduce incoming glare from the sides of said sunglasses while also permitting the passage of air therethrough;

binoculars adapted to be placed against the outer substantially flat surfaces of said polarized lenses, said binoculars including two separate optical arrangements coupled to a central shaft, wherein at least one of said separate optical arrangements is adapted to be rotated about said central shaft such that the angle defined by said two separate optical arrangements and said central shaft is adjustable, and wherein both of said separate optical arrangements have infinite focal lengths; and a connector adapted to couple said binoculars to said sunglasses, said connector including a first fixed attachment connected to said lightweight frame, a second fixed attachment connected to said binoculars, and one or more adjustable components disposed therebetween, said one or more adjustable components being adapted either alone or in combination to permit a customized placement of said binoculars against said sunglasses, and to permit said binoculars to be flipped up and away from said sunglasses while remaining coupled thereto, wherein said sunglasses and said binoculars are adapted to operate in conjunction with each other to create a full field of view for said user, said full field of view having a central portion that is magnified and an outer portion that is not magnified, wherein said user can observe both said visual target in said central portion and a separate object in said outer portion simultaneously and without detriment to each other.

2. The handsfree optical device of claim 1, wherein at least a portion of said lightweight frame is titanium.

3. The handsfree optical device of claim 1, wherein one or more of said perforated sideshields are metallic.

4. The handsfree optical device of claim 1, wherein said device is adapted to be used to spot objects underwater at a distance of at least 40 feet from said user.

5. The handsfree optical device of claim 1, wherein said second fixed attachment is removably connected to said lightweight frame, such that said connector and said binoculars can be readily detached from said sunglasses.

6. The handsfree optical device of claim 1, wherein at least a first adjustable component of said one or more adjustable components of said connector includes a spring loaded mechanism, wherein said spring loaded mechanism facilitates a manual adjustment of said first adjustable component from a first stable position to a second stable position without the need for any external tool.

7. An apparatus, comprising:

eyeglasses adapted to be worn on the head of a user, said eyeglasses including two polarized lenses coupled to a frame having a frontal portion and two adjoining arms, said polarized lenses having base curves that are less than about six diopters;

a set of optical loupes adapted to be placed against the outer surfaces of said polarized lenses, said set of optical loupes including at least two separate lens arrangements, wherein each of said at least two separate lens arrangements have focal lengths greater than about ten feet; and a connector adapted to couple said set of optical loupes to said eyeglasses, said connector being adapted to permit said set of optical loupes to be moved from a first stable position against said eyeglasses while coupled thereto to a second stable position away from said eyeglasses while remaining coupled thereto, wherein said eyeglasses and said set of optical loupes are adapted to operate in conjunction to create a full field of view having a central portion that is magnified and an outer portion that is not magnified, wherein a user of said apparatus can observe objects in both of said central and outer portions simultaneously.

8. The apparatus of claim 7, further including:

a first sideshield coupled to the left side of said frame and a second sideshield coupled to the right side of said frame, said first and second sideshields being arranged to reduce incoming glare from the sides of said eyeglasses.

9. The apparatus of claim 8, wherein at least one of said first and second sideshields is perforated such that air is permitted to pass therethrough.

10. The apparatus of claim 9, wherein at least one of said perforated sideshields comprises a grid of perforations that extends to all edges of said perforated sideshield.

11. The apparatus of claim 7, wherein said apparatus is adapted to be used to spot objects underwater at a distance of at least 40 feet from said user.

12. The apparatus of claim 7, wherein said connector includes a first fixed attachment connected to said set of optical loupes, a second fixed attachment connected to said frame, and at least two adjustable components therebetween adapted alone or in combination to permit a customized placement of said set of optical loupes against said eyeglasses.

13. The apparatus of claim 12, wherein said second fixed attachment is removably connected to said frame, such that said connector and said set of optical loupes can be readily detached from said eyeglasses.

14. The apparatus of claim 7, wherein said connector includes at least one spring loaded mechanism, said spring loaded mechanism being adapted to facilitate a manual adjustment of said connector from a first stable position to a second stable position without the need for any external tool.

15. The apparatus of claim 7, wherein each of said at least two separate lens arrangements have infinite focal lengths.

16. The apparatus of claim 7, wherein set of optical loupes comprises binoculars.

17. A method of viewing objects underwater, comprising:

wearing by a user a handsfree optical device including:

eyeglasses adapted to be worn on the head of said user, said eyeglasses including two polarized lenses coupled to a frame having a frontal portion and two arms, said polarized lenses each having a base curve that is less than about six diopters, a set of optical loupes adapted to be placed against the outer surfaces of said polarized lenses, said set of optical loupes including at least two separate lens arrangements, wherein each of said at least two separate lens arrangements have focal lengths greater than about ten feet, and a connector adapted to couple said set of optical loupes to said eyeglasses, said connector being adapted to permit said set of optical loupes to be moved from a first stable position against said eyeglasses while coupled thereto to a second stable position away from said eyeglasses while remaining coupled thereto, wherein said eyeglasses and said set of optical loupes are adapted to operate in conjunction to create a full field of view having a central portion that is magnified and an outer portion that is not magnified;

moving the head of said user such that said handsfree optical device is directed toward a region that is at least partially underwater; and observing at least one underwater object at said region through said handsfree optical device, wherein observation is made of said first underwater object through said central portion of said full field of view and said first underwater object or one other object through said outer portion of said full field of view simultaneously.

18. The method of claim 17, wherein said connector includes at least one spring loaded mechanism, said spring loaded mechanism being adapted to facilitate a manual adjustment of said connector from said first stable position to said second stable position without the need for any external tool.

19. The method of claim 18, further including the step of:

manually adjusting said set of optical loupes from said second stable position away from said eyeglasses to said first stable position against said eyeglasses while said handsfree optical device is being worn by said user.

20. The method of claim 19, wherein said manually adjusting step occurs after said moving step, but before said observing step.

* * * * *